Figure 16:
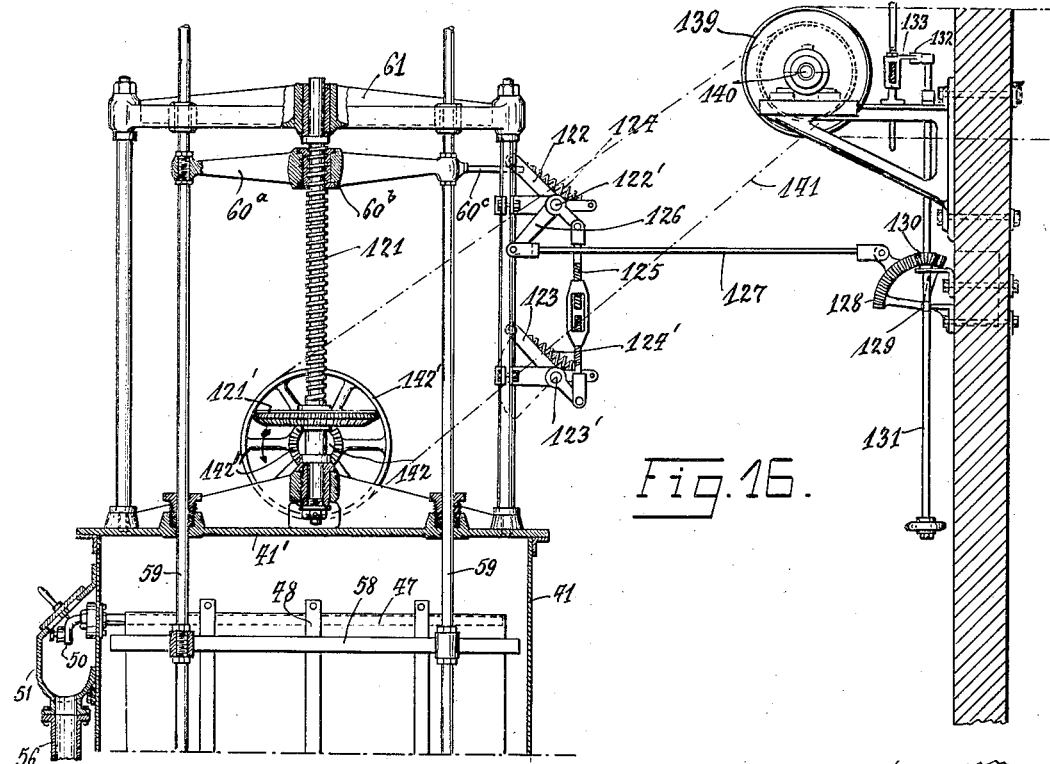

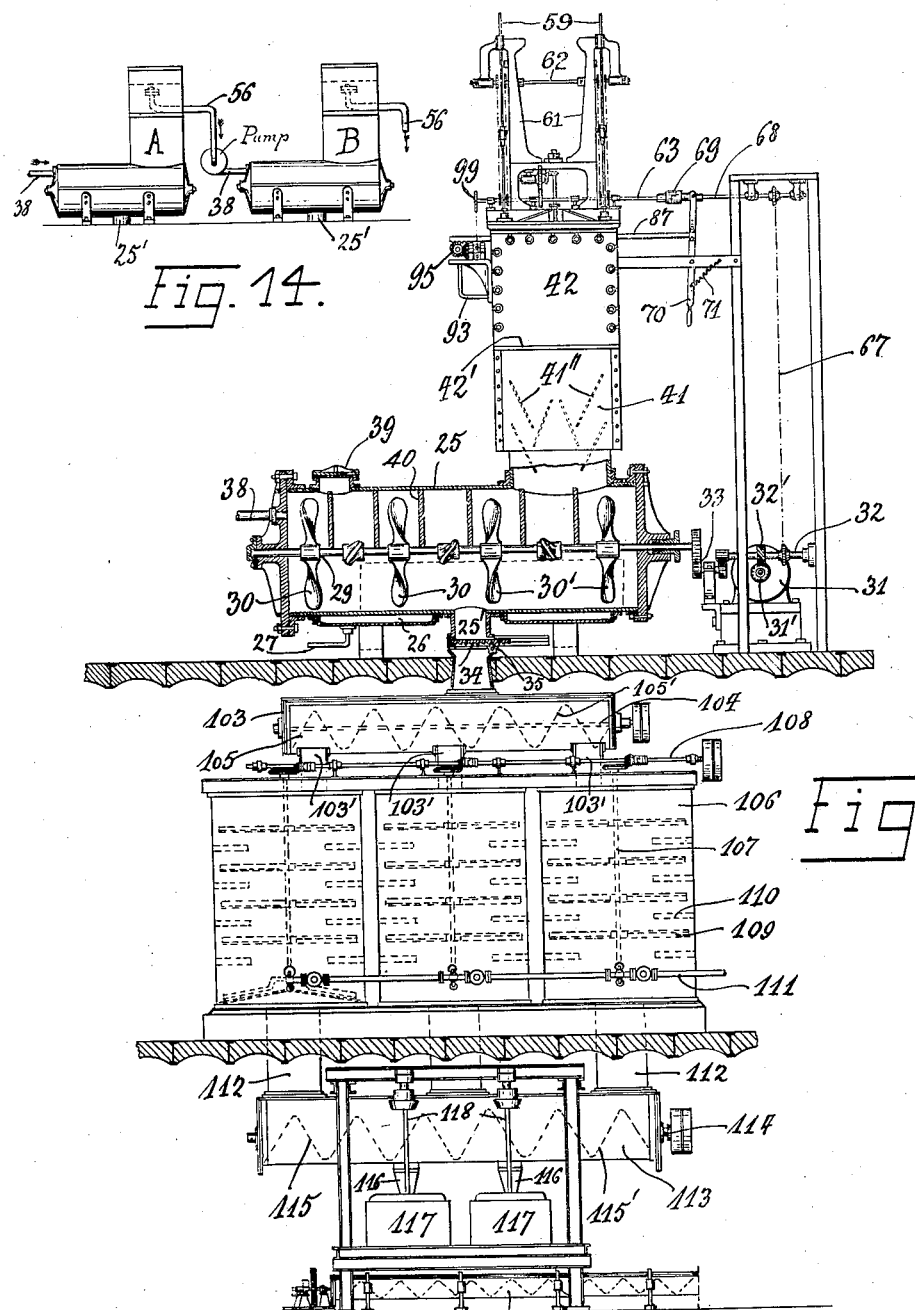

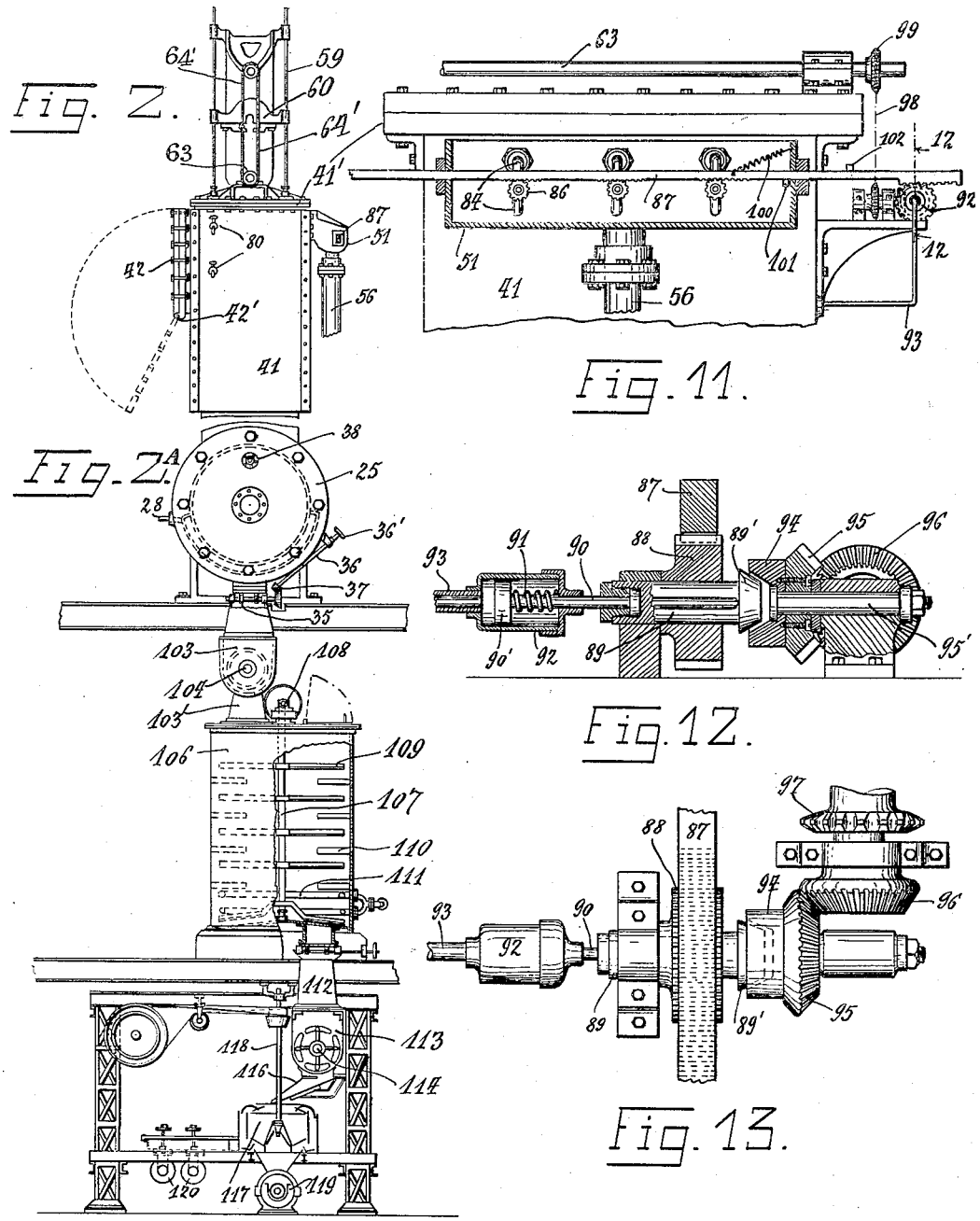

April 7, 1925.  J. N. A. SAUER  1,533,032
PURIFYING, FILTERING, AND SEPARATING APPARATUS AND PROCESS
Filed March 5, 1920   6 Sheets-Sheet 3
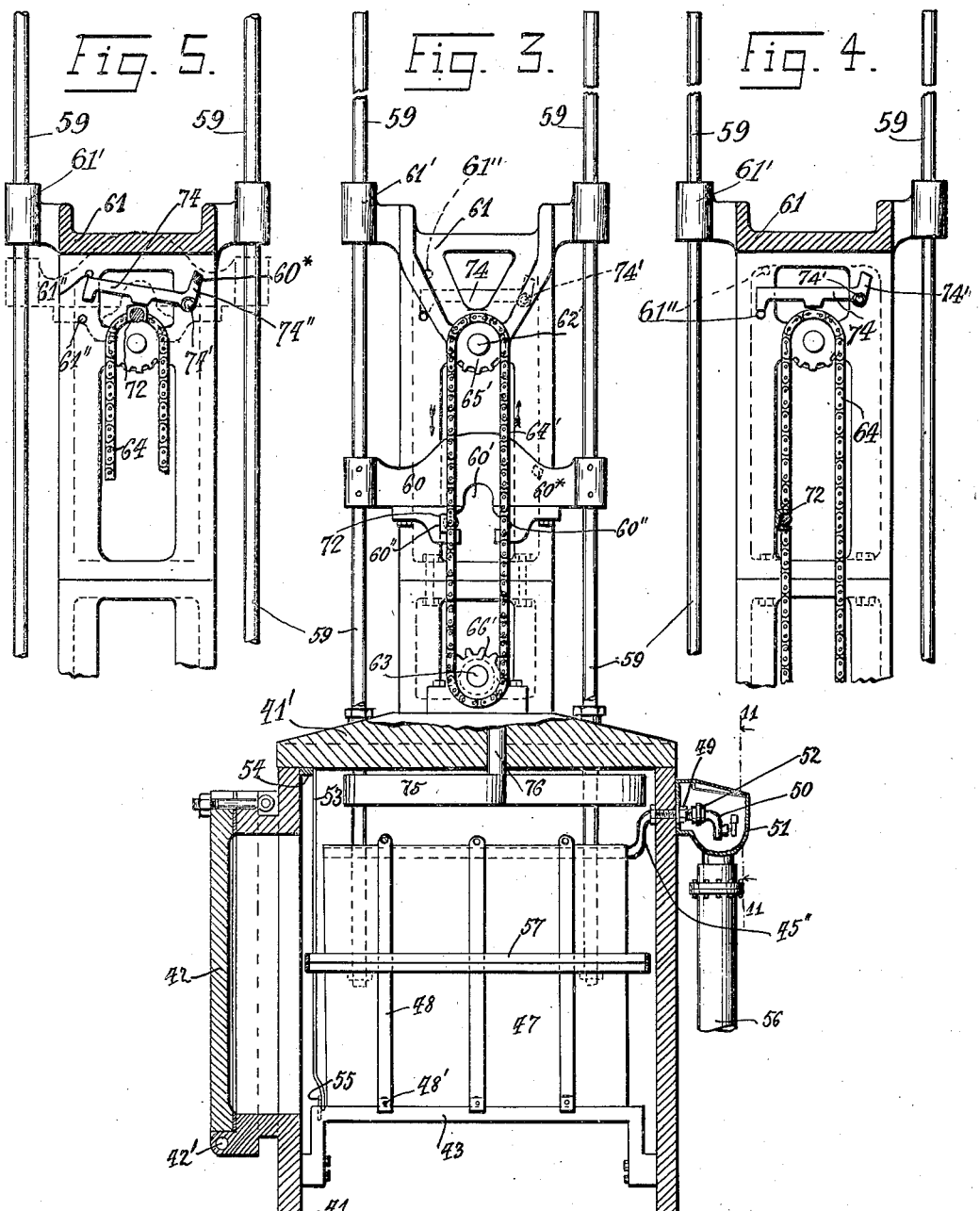
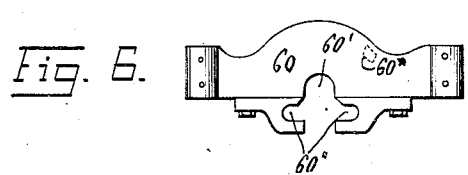
WITNESS:
INVENTOR.
Johan N. A. Sauer
BY
John Lotka
ATTORNEY.

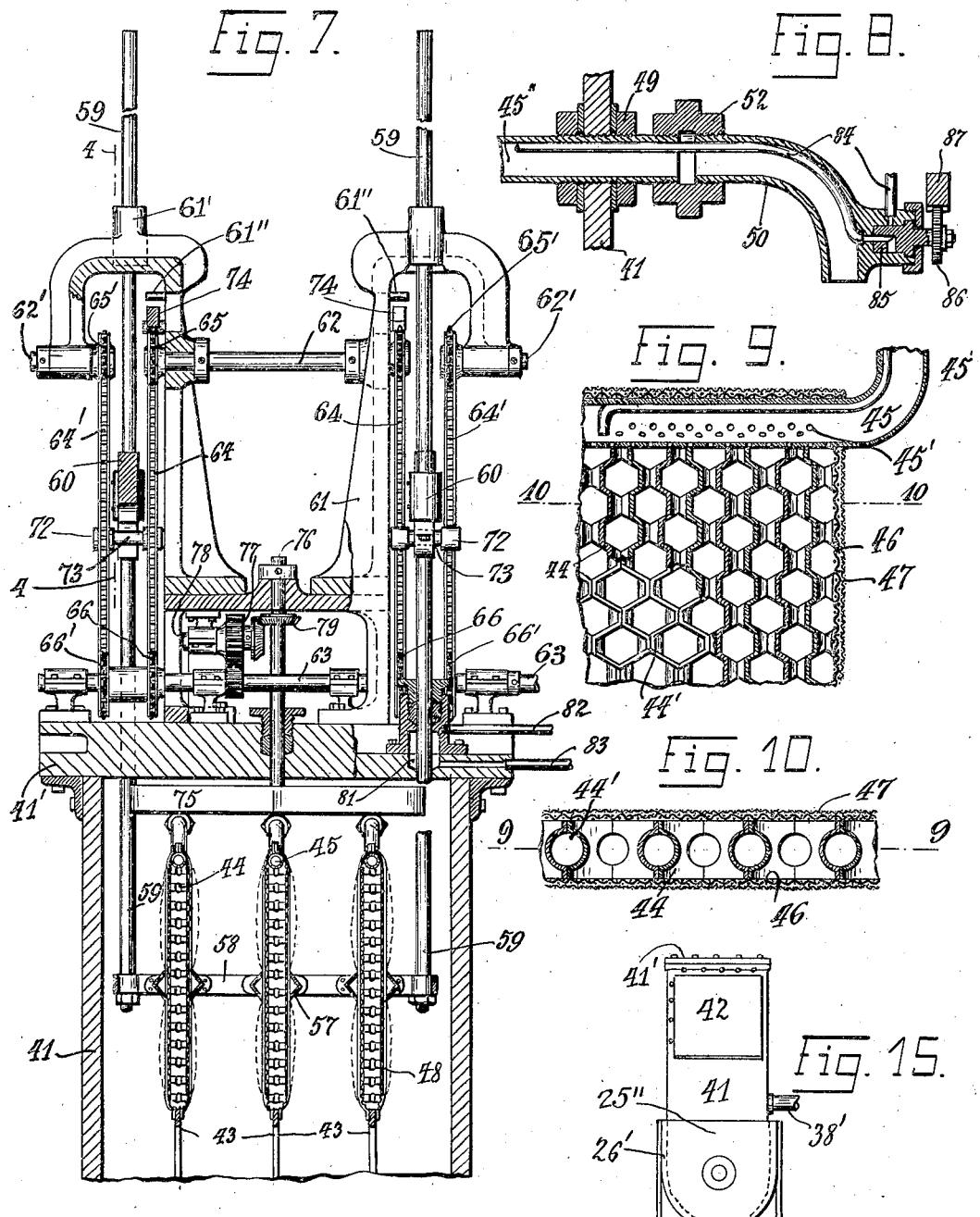

April 7, 1925.
J. N. A. SAUER
1,533,032
PURIFYING, FILTERING, AND SEPARATING APPARATUS AND PROCESS
Filed March 5, 1920
6 Sheets-Sheet 5

WITNESS:
D. Mathé

INVENTOR.
Johan N. A. Sauer,
BY
John Lotka
ATTORNEY.

Patented Apr. 7, 1925.

1,533,032

UNITED STATES PATENT OFFICE.

JOHAN NICOLAAS ADOLF SAUER, OF AMSTERDAM, NETHERLANDS.

PURIFYING, FILTERING, AND SEPARATING APPARATUS AND PROCESS.

Application filed March 5, 1920. Serial No. 363,366.

*To all whom it may concern:*

Be it known that I, JOHAN NICOLAAS ADOLF SAUER, a subject of the Queen of the Netherlands, and resident of Amsterdam, Netherlands, have invented certain new and useful Improvements in Purifying, Filtering, and Separating Apparatus and Processes, of which the following is a specification.

My present invention relates to the purification, filtration and subsequent separation of liquids and also to the separation or collection of solids from liquids in which they are suspended. It particularly relates to the type of filtration or separation in which the liquid to be purified, filtered and separated is first mixed with a filtering or purifying substance, such as for instance kieselguhr, fuller's earth, and decolorizing carbons, the mixture being subsequently passed through a filtering or separating apparatus, the separation being effected either by filtration, decantation, distillation or by centrifugal force. The invention also relates to the type of separation in which the liquid is continuously or intermittently separated from the solids and these solids are kept in the process of separation without being removed from the combined mixing and separating apparatus during the said process of separation.

The object of my invention is also to improve processes and apparatuses of this character for the purpose of increasing their filtering or separating capacity as well as the quality and purity of the liquid delivered, thereby effecting an economy in the use of purifying material.

An important feature of this invention consists in treating liquids with an excess of purifying agents in a more or less fine state of subdivision (if desired the mass may be distributed over a plurality of apparatuses connected in series) in a continuous manner and in such a way that by passing the liquid through the filter or mixing tank the liquid will be kept thoroughly mixed with practically the whole of the purifying agent.

In contradistinction to the well-known column system, the material is kept in motion and suspension, so that it may be exhausted uniformly and completely.

According to this method, that portion of the material which is mechanically carried away by the flowing liquid on leaving the mixing apparatus is kept back by a separating device. In order to enable the separating device (such as a filter) to be operated continuously; and this is a further feature of the new method, the material deposited on the filter surface is removed therefrom by mechanical means and led back to be mixed anew with the liquid and to act again on the liquid entering the apparatus. The material may be kept in motion inside the apparatus, for instance by stirrers or the like, until it has in its entirety reached such a degree of exhaustion as can possibly be obtained under the conditions prevailing in each individual case.

The characteristic advantages of this new process are as follows:

The purifying material in a more or less finely divided condition (in which state said material offers a larger surface for the attraction of material to be adsorbed), can be used in a practical way in large quantities to exert its adsorptive power on comparatively small amounts of liquid at a time, whereby a degree of exhaustion of said purifying material can be reached which would be practically impossible otherwise, while the treatment of the liquid is effected continuously or intermittently.

The use of finely powdered decolorizing carbons now upon the market, which powerful porous carbons are of vegetable origin, is of exceptional advantage in this process. Hitherto, these carbons, although other forms of carbons can be used, could not be applied in a continuous process in a practical way (using large quantities), owing to their fine state of subdivision.

By the use of this invention the abovementioned new technical effect is obtained by keeping the material as well as the liquid to be treated therewith, in constant motion, for instance by using mixing means (stirrer arms or compressed air) or other means for keeping the mixture in motion.

It is important, when operating with large amounts of purifying material, that the operation be continuous and that the material and the liquid after acting on each other be separated in such a way that only the liquid will leave the apparatus while the purifying material is retained, and that the said material continuously and practically in its entirety remains in intimate contact with the liquid to be treated, until the material has reached the desired degree of exhaustion.

My invention is applicable not only to the treatment of liquids with purifying or decolorizing agents, but quite generally to the accumulation or collection of solids in a liquid medium, that is to say, such solids need not always be filtering purifying or (absorbent) substances, as in the example given above.

The term "purifying" or "purification" in this specification is to cover the entire or partial removal of any or all substances, which it is desirable to eliminate from the liquid to be treated and this term relates to the removal of dissolved matter (coloring matter, gums, etc.) as well as to that of suspended impurities. The term "purifying-" or "filtering-material" in this specification is to cover any material or mixture of materials capable of carrying out the entire or partial removal of any or all substances in the liquid to be treated, which are desirable to be eliminated from said liquid, which removal may thereby at the same time facilitate the filtration or render the liquid easily filtrable in further operations.

When used in connection with a filtering or purifying substance, my invention may insure highly satisfactory results by a so called "mass-action", that is to say by using a comparatively large amount or bulk of the filtering or purifying material, which is brought continuously in contact with the liquid under treatment. Heretofore it has been practically impossible to utilize the advantageous action of finely divided powdered filtering or purifying materials if employed in excess with regard to the liquid under treatment and a continuous or semi-continuous process was excluded.

Other features of my invention, which will be brought out fully in the description following hereafter, relate to the recovery of the soiled filtering or purifying material from the apparatus and to its further treatment in supplemental vessels or apparatuses, to means for effecting the movement of, say, scrapers, when using filters, to devices for preventing the moving parts from becoming sticky, owing to the presence of gummy, slimy or sticky substances or of sugar juices and like liquids, to means for detaching from the filtering or separating surface by air pressure any accumulation of solids which may become so compressed or so great as to interfere with the proper passage of the liquid, and to various other features tending to enhance the efficiency of the apparatus and of the process.

Figure 17:
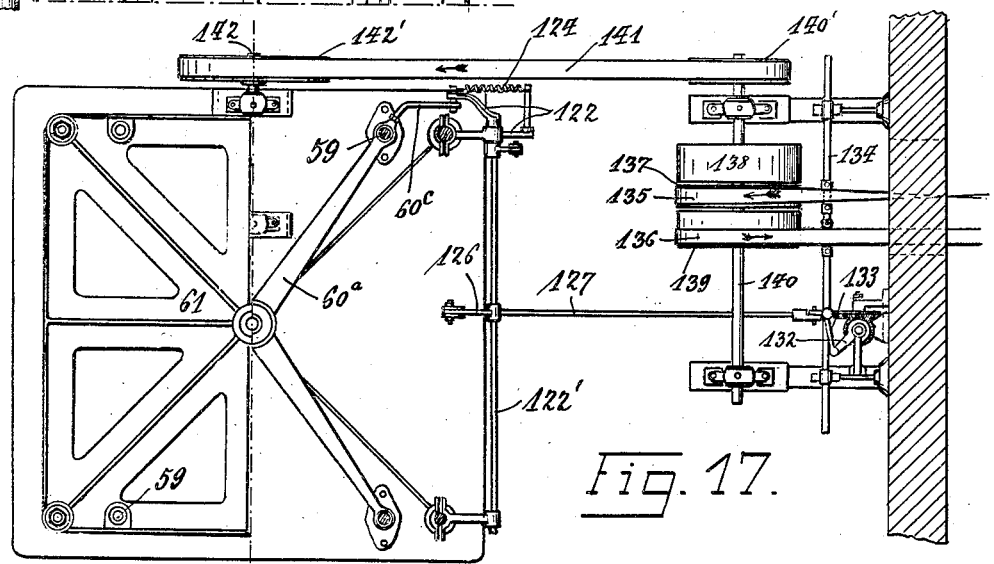
Figure 18:
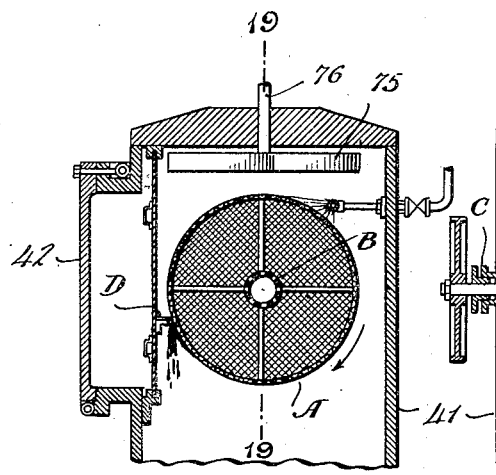
Figure 19:
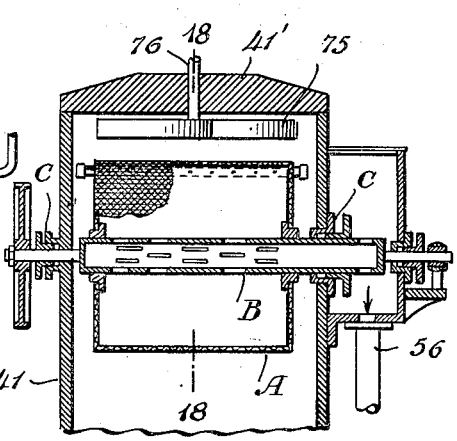
Figure 20:
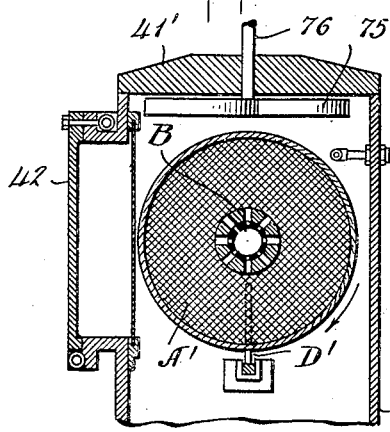
Figure 21:
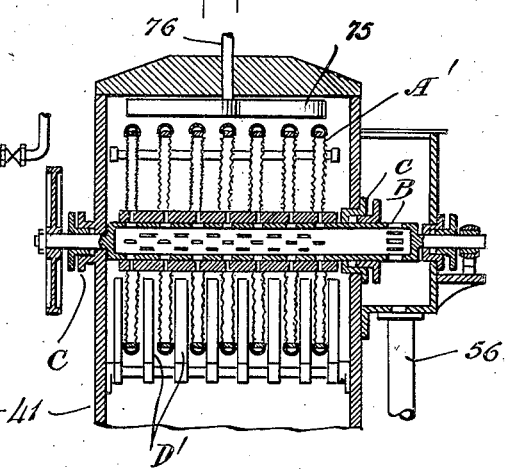

Several embodiments of apparatus according to my present invention are illustrated in the accompanying drawings, in which Fig. 1 is a front elevation of a complete apparatus, using a filter for the separation of solids from liquids with parts in section; Fig. 2 is an end view thereof, looking from the right of Fig. 1 with parts in section and parts omitted; Fig. 2ª is an end view of the lower portion of the apparatus, looking in the direction opposite to Fig. 2; Fig. 3 is a detail elevation of the upper portion of the said apparatus, with parts in section, looking in the same direction as in Fig. 2; Fig. 4 is a view showing some of the parts of Fig. 3, in the same position, but partly in section on the line 4—4 of Fig. 7; Fig. 5 is a view similar to Fig. 4, but showing the parts in a different position; Fig. 6 is a detail view of a cross head, forming part of the mechanism; Fig. 7 is an elevation taken at right angles to Fig. 3, looking from the left of Fig. 3 with parts in section; Fig. 8 is a detail view of one of the liquid outlets, in longitudinal vertical section; Fig. 9 is a detail view showing a portion of the filter elements, in longitudinal vertical section on the line 9—9 of Fig. 10; Fig. 10 is a horizontal section on the line 10—10 of Fig. 9; Fig. 11 is a detail in vertical section on the line 11—11 of Fig. 3; Fig. 12 is a vertical section on the line 12—12 of Fig. 11; Fig. 13 is a top view of the parts shown in Fig. 12; Fig. 14 is an elevation showing a plant or battery comprising two mixing apparatuses and filters of the character referred to herein; Fig. 15 is a diagrammatic view showing a slightly different form of mixer and filter; Fig. 16 is a vertical section showing a different drive for the scrapers; Fig. 17 is a corresponding top view; Figs. 18 and 19 are vertical sections, taken on line 18—18 of Fig. 19 and line 19—19 of Fig. 18 respectively, showing a different construction of the filter portion of the apparatus; and Figs. 20 and 21 are corresponding vertical sections of still another construction of the filter portion.

Instead of the filter proper, as shown in Fig. 7, I may use a cylindrical element or filter drum A (Figs. 18 and 19), or circular filter elements A' (Figs. 20 and 21) fitted on a horizontal perforated and revolving hollow shaft B, which shaft passes through stuffing boxes C. The scrapers D (Figs. 18 and 19) or D' (Figs. 20 and 21), to remove the material deposited on the filter elements may be fixed in a constant, unmovable position. The rotation of the hollow shaft, carrying the said filter element or elements, causes the removal of the said material deposited on the filter element or elements by the contact with the said fixed scrapers. The said scrapers are set in a suitable position to carry out the above function. The filtered or separated liquid passes through the filter element-lining, which may either be cloth or metallic cloth, into the hollow shaft and thence to the exterior of the filter.

Another feature of my invention consists in discontinuing the supply of liquid into the filtering and separating unit, when pressure is applied, or the withdrawal of the filtered or separated liquid from the said unit, when vacuum is applied, during the intermittent removal of the deposit of filtering or purifying material or of solids on the surface of the filtering or separating means used, so as to permit this removal while no pressure or vacuum is applied, which might tend to hold said deposit on the said surface, as in that case the deposit will be removed in its entirety from said surface, practically without leaving any of said deposit on said surface, after which cycle of operations the supply of the liquid into the filtering and separating unit, or the withdrawal of the filtered or separated liquid from said unit, might be restored again, repeating said cycle of operations every time the intermittent removal of said deposit from said surface was to take place.

The mixing and filtering or separating apparatus illustrated by Figs. 1 to 13 is composed of a horizontal drum 25 which may be provided with a jacket 26 said jacket having a suitable inlet 28 for the admission of steam or other heating or cooling mediums (extending, say, around the lower half of the drum only) and a suitable outlet 27. The said jacket may of course be extended to cover the whole mixer including the uptake. A shaft 29 supported by the heads of the drum or by suitable bearings, and which passes through the heads carries a number of mixing or stirring arms 30, and 30' of screw-type. (These stirrers are to be made to suit any special condition.) The arms 30, located on one side of the drum outlet 25' are of a pitch opposite to that of the arms 30' which are located on the other side of said outlet, and the shaft 29 is rotated in such a direction that both sets of arms or stirrers will tend to feed the material towards said outlet 25'. These arms or stirrers may be set to meet any desirable condition, say to feed the material to one side only, or to evenly distribute the material. As an example of a suitable drive for the shaft 29, I have shown a motor 31 (say, an electric motor) with a worm 31' driving a shaft 32 through the medium of a worm wheel 32', said shaft being connected with the shaft 29 by speed-reduction gearing 33. The outlet 25' is normally closed by a valve 34 mounted to slide to and from its open position. The valve 34 is operated by means of pinions 35 on a transverse shaft, and a hand-wheel 36' on an inclined shaft 36 connected with the said transverse shaft by bevel gearing 37, the valve 34 having a rack which is engaged by said pinions. The drive may, of course, be carried out by any suitable means. At one end of the drum is located a pipe 38 forming an inlet for the liquid to be treated, and adjacent to this end, I have also shown an aperture, normally closed by a cover 39, through which the charge of filtering material (say, highly active decolorizing vegetable carbon) is introduced say at the beginning of the operation. In the upper half of the drum are arranged depending partitions or suitable baffles 40, between the paths of the stirrers 30, 30'.

At the end opposite to the inlet 38, or at a suitable position along the drum and above the latter, is arranged an upright casing or uptake 41 which may be cylindrical or rectangular in cross section, the lower end of said casing or uptake being open to the interior of the drum 25. On one side the casing 41, as shown in the drawings, has an opening normally closed by a door 42, which may be swung on a horizontal hinge 42', as indicated by dotted lines in Fig. 2, or on a hinge in any suitable position. This opening serves for the insertion and removal of the filter elements which are placed in the upper portion of the casing 41. Adjacent to the lower edge of said opening are located horizontal guides 43, one for each of the filters (of which there are three in the particular example illustrated) and, for a purpose stated below, the ends of these guides 43 are bent downward and secured to the walls of the casing 41 at a level below their upper or guiding portions.

Each filter is a rectangular hollow frame or bag, and comprises a core 44, an outlet pipe 45 extending horizontally at the top of the core, a covering 46 made of wire netting, which forms a complete envelope for said pipe and core, a cloth bag 47 applied to the outside of the wire netting, and a number of metal bands or strips 48 surrounding said bag in vertical planes. Each band is shown as consisting of two members engaging the respective bag 47 on opposite sides, the upper ends of such members being secured in mutual contact, while their lower ends are spaced to embrace or straddle the horizontal guides 43, while the pins 48' which connect said lower ends are adapted to rest and ride on said guides. The bag 47 fits tightly on the pipe 45 where the latter passes through it. Said pipe is provided with perforations 45' or a slot for its entire length by which it communicates with the interior of the bag 47. The core 44 is of the special construction illustrated, being made of metal bands bent to form hexagonal cells having tubular vertical portions wherever two adjacent cells are in contact. These tubular portions 44' are arranged in columns, so as to afford a free upward (vertical) path for the liquid from the lower portion of the core to the pipe 45. Each pipe 45 is provided, at the end opposite to the door 42, with an upturned end portion 45" extending through the rear wall of the casing 41, being secured thereto by a nut 49. Outside of the casing this end of the pipe leads to an outlet 50 discharging into a trough 51 common to all of said pipes and outlets. The connection of the outlet 50 with the end of the corresponding pipe 45 may be made by means of a threaded sleeve or union 52. The parts so far described might suffice for holding the filters in place, but for greater security the end of each filter adjacent to the door 42 is normally engaged by a removable vertical bar 53 the upper end of which rests against an abutment 54 while its lower end is held in place by a removable pin 55, fitted into the corresponding guide 43. The trough 51 has an outlet pipe 56 leading to any apparatus or place selected for the storage, further treatment, or other disposal of the liquid passing out of the filters through the pipes 45, 50. It will be understood that the opening normally closed by the door 42 is of such size and location that each of the filters may be removed therefrom readily, after first withdrawing the pin 55 and bar 53, and disconnecting the outside end 45" of the pipe 45 from the outlet 50. In applying and removing a filter, the lower ends of its surrounding bands 48 straddle and slide along the horizontal guide 43.

Adjacent to the wide vertical surfaces of the filter bags 47 and adjusted to reciprocate vertically, are scrapers 57, which extend horizontally and have their upper and lower surfaces inclined so as to diverge from the filter surfaces which they are intended to clean. These scraper bars are carried by, say, a rectangular frame 58 connected to four rods 59 which slide vertically through the top of the casing 41. These rods 59 are arranged in pairs, each pair being connected by a cross head 60. Above these cross heads, the rods 59 extend through stationary guides 61' on brackets 61 supported oppositely on the top of the casing 41. These brackets are also provided with bearings for two parallel horizontal shafts 62, 63 extending from one bracket to the other (Fig. 6). The upper shaft 62 is shorter than the shaft 63, and is connected therewith by two chains 64 engaging sprocket wheels 65 and 66 arranged to rotate with the shafts 62, 63 respectively. In line with the shaft 62, near each end thereof, are two short shafts 62', likewise journaled in the brackets 61 and carrying sprocket wheels 65' connected by chains 64' with sprocket wheels 66' on the shaft 63. The shaft 63 is driven from the shaft 32 by means of a chain 67 actuating a countershaft 68 supported in line with the shaft 63 and normally coupled thereto by means of a clutch 69. This clutch may be thrown out manually by means of a lever 70, a spring 71 tending to keep the clutch engaged. The chains 64, 64' carry blocks 72 secured rigidly to a link of each chain and straddling such chain. Each chain 64 is arranged adjacent to one of the chains 64', and the blocks 72 of companion chains are connected with each other, by a rod on which is mounted a roller 73. This roller is adapted to drive the respective cross head 60 in the following manner: At its central portion, each cross head has an opening or recess 60' with lateral sockets 60" arranged in the planes of the respective vertical runs of the chains 64, 64'. When the blocks 72 and rollers 73 are on the downwardly-moving runs of the chains, as in Fig. 3, said rollers are in the left-hand sockets 60" and drive the cross heads 60 downward, imparting a like movement to the rods 59 and to the scrapers 57, the latter moving along the bands 48, which form guides for said scrapers and also prevent actual contact of the scrapers with the cloth bags 47. As the rollers 73 follow the chains 64, 64' around the lower sprockets 66 and 66', they gradually move out of the left-hand sockets 60", and during the time that such rollers are out of engagement with the cross heads, in the lower position of the latter, said cross heads rest on the shaft portions between the sprockets 66 and 66' of the same pair, the upper end of the recess 60' being curved to fit this portion of the shaft 63. As the rollers 73 pass to the right-hand upwardly-moving runs of the chains 64 and 64', they enter the right-hand sockets 60" and impart the upstroke to the cross heads 60, the rods 59, and the scrapers 57. At the upper end of the device, the rollers 73 are carried from the right-hand sockets 60" to the left-hand sockets by the travel of the chains 64 and 64' around the sprockets 65 and 65', thus bringing said rollers into proper position for the next downstroke. In order that the cross heads 60 and the parts connected therewith may be properly supported during the short time that the rollers 73, at the upper end of their movement, are out of contact with the cross heads 60, the blocks 72 are adapted to engage and lift arms 74 pivoted at 74' on the upper portions of the brackets 61 and movable between stops 61". Normally, each arm 74 drops by gravity into engagement with the lower stop 61"; in the raised position, however, (Fig. 5), the arm 74 has its end 74" thrown into the path of a projection 60* on the cross head 60, so that the cross head will be supported on said arm, and on the shaft 62 through the medium of the blocks 72, while the rollers 73 are passing from the right-hand sockets 60" to the left-hand sockets. The formation of the engaging surfaces of the ends 74'' and of the projections 60* on the cross heads 60 is such that as soon as the blocks 72 no longer engage and support the arms 74 in the raised position, the weight of the scrapers and other parts connected with said cross head will cause the arms 74 to swing back toward their original position, and by that time the rollers 73 will have entered the left-hand sockets 60'', so as to be in proper supporting and driving engagement with the cross heads. Preferably the entrance ends of these sockets (and of the other sockets as well) will be beveled so as to facilitate the engagement (and disengagement) of the rollers with the sockets. The position of the scrapers 57 at the end of the downstroke and at the end of the upstroke is such as to leave a clear passage for the insertion and removal of the filters proper through the opening normally closed by the door 42; however, it would be sufficient if the scrapers cleared this opening in only one of their positions. The object of attaching the members 43 at points below their horizontal guiding portions, and of leaving a space between the ends of said portions and the adjacent walls of the casing or uptake 41, is to enable the scrapers and the frame 58 carrying them to pass down far enough to clear the said opening, and also to enable the scrapers to reach the lowermost points of the filters.

In the form illustrated, the scrapers 57 in their uppermost position are still at a certain distance below the inner wall of the cover of the casing 41, and in this space not reached by the scrapers there are arranged cleaning arms 75 radiating from a vertical shaft 76 journaled in the cover 41' of the casing 41 and driven from the shaft 63, by means of spur-gearing 77 operating a counter-shaft 78 and bevel-gearing 79 connecting said counter-shaft with the vertical shaft 76. The arms 75 will act as stirrers in the uppermost part of the casing 41 and will also clean the upper edges of the scrapers 57 when the latter are in their uppermost position.

In order to provide a vent for the air contained in the mixing drum 25 and in the casing 41 at the beginning of the operation, one or more cocks are provided at the upper portion of the filter casing, for instance as indicated at 80 in Fig. 2. The cocks 80 at different levels of said casing, can be utilized as vents or to sample the liquid under treatment.

In some cases, when sticky liquids, such as sugar juices, are treated, it is desirable to prevent such liquids from forming a sticky deposit on the parts, such as the rods 59, which move through the walls of the column or casing 41. For this purpose, I have shown a chamber 81 adjacent to the point where a rod 59 passes through the cover 41', with an inlet tube 82 for the admission of a suitable heating or dissolving medium, say steam, which medium, if desired, may pass out through another tube 83.

The operation of the scrapers 57 and the manner in which they are set will prevent the layer of solids deposited on the outside of the filter bags from getting too compressed by the pressure or vacuum applied or from attaining too great a thickness; nevertheless, if the scrapers are not cleaning the cloth thoroughly after a certain time impurities deposited on the outside of said bags may obstruct the passage to such an extent that the filtering or separating operation will proceed very slowly owing to the increased resistance offered by the compressed or sticky layer thus deposited. To clear the outer surfaces of the filter bags 47 in such cases, and also under other circumstances, if desired, I have provided the following arrangement: A medium under pressure, say compressed air, may be led from any suitable source through pipes 84 into the interior of the filter elements proper. As illustrated, these pipes 84 may be arranged within the outlets 50 and pipes 45, and are normally closed by cocks 85. These cocks carry pinions 86 in mesh with a horizontal rack 87 which also has rack teeth in mesh with a driving pinion 88. Normally, this pinion is stationary, but at times it is driven, to operate the rack 87 and open the cocks 85, for instance by the following mechanism: The pinion 88 is mounted on a sliding actuator 89 provided at one end with a clutch member 89'. The other end of said actuator is connected with a piston rod 90 in such a manner as to compel these parts to move together lengthwise while allowing the actuator to turn without rotating said piston rod. On said piston rod is secured a piston 90' pressed by a spring 91 in such a direction as to tend to disengage the clutch member 89'. The piston is arranged within a stationary cylinder 92, connected by a pipe 93 with the interior of the uptake or casing 41 so that if the pressure within the apparatus rises sufficiently to overcome the action of the spring 91, the piston will be moved against the tension of said spring, thereby engaging the clutch member 89' with the permanently driven companion clutch member 94 which is rigid with a bevel pinion 95. The latter meshes with another bevel pinion 96, connected rigidly with a sprocket wheel 97, driven from the shaft 63 by means of a chain 98 and sprocket wheel 99. The pinion 88 may be rigid with the actuator 89, in which case said pinion must be wide enough to remain in mesh with the rack 87 notwithstanding the axial movement of such pinion; or the pinion may have a purely rotary movement, in which event the actuator 89 would slide through the pinion, but in either case actuator and pinion are arranged to rotate in unison.

Whenever (after closing the outlets 50 to the surrounding outside air, for instance by plugs applied to the discharge orifices of these outlets, or by cocks controlling these orifices) the cocks 85 are opened by the mechanism described, the pressure of the air or other medium admitted to the interior of the filters will cause them to bulge outwardly as has been indicated by dotted lines in Fig. 7, and such action will cause the material adhering to the outside of the bags 47 to crack and fall off, thereby reducing the resistance which the filter opposes to the passage of the liquid. The reciprocation of the scrapers 57 may be arrested during the bulging of the filter bags 47. In order to accomplish this, the clutch lever 70 may be operated manually to disconnect the drive of the shaft 63. It may be preferable to throw out the drive of this shaft automatically whenever the cocks 85 are opened, and for this purpose the rack 87 may be arranged to operate the lever 70, either by having an indirect connection with said lever, or preferably by simply having the end of the rack 87 in engagement with the lever 70, as indicated in Fig. 1. In this case, the spring 71 connected with the lever 70 will also act to restore the rack 87 and the valves or cocks 85 to their normal position, but it may be desirable to provide an additional spring 100 (Fig. 11) connected directly with the rack 87. If the latter is in loose engagement with the clutch lever 70, as indicated, it becomes possible to actuate the clutch lever manually without opening the cocks 85, which may be desirable in some cases. As soon as the resistance to the flow of liquid is reduced in the manner described, and the pressure within the apparatus falls, the spring 91 will bring the clutch members 89' and 94 out of engagement, thus stopping the drive of the pinion 88 which tends to keep the rack 87 in the position in which the valves or cocks 85 are open, and the spring 71 or the spring 100 will close said cocks. Stops 101 and 102 limit the movement of the rack 87 at the exact points where the cocks 85 are closed and open respectively. When the rack has reached the position in which it engages the stop 102, the clutch member 94 will slip on the clutch member 89', if the drive or rotation of the former should continue for a while after the rack 87 has reached the stop 102.

The operation of the apparatus so far as described above may be conducted in the following manner: The cover 39 having been removed, I put into the apparatus consisting of the mixing drum 25 and uptake 41 the desired charge of filtering aids or purifying material either in dry form or mixed in advance with the liquid to be treated. This will generally be a pulverulent material, and if the liquid is to be decolorized and rendered filterable I prefer to use a very efficient decolorizing carbon of vegetable origin, consisting of about 90% of pure carbon (the percentage being figured on the dry substance, that is, disregarding any moisture present) in a porous and highly adsorbent state, but other decolorizing carbons or filtering aids for purifying may be employed, such as kieselguhr, fuller's earth, ordinary charcoal, finely divided boneblack, etc. The amount of filtering material varies with circumstances, but in any event, it is preferable to use much larger amounts than has been customary hitherto under similar conditions. This amount may vary from less than five per cent, to 20% and even 30% or more, if such is possible, of the amount of liquid undergoing treatment at any particular moment. These percentages are based on the liquid capacity of the drum 25 and uptake 41 remaining after the introduction of such filtering or purifying agent. The cover 39 is then closed and the liquid to be treated is admitted at 38. The mechanical parts, such as the mixing or stirring members 30 and 30' are set in motion, during the filling of the mixing drum. It is sometimes preferable, at the start of the operation to leave the scrapers 57 in the uptake at rest, by disengaging the clutch 69. The cocks 80 are left open. As the liquid begins to escape at the lowermost cock 80, this cock is closed, and the successive cocks 80 are closed in turn in the same manner, this procedure allowing the air originally contained in the apparatus to escape more readily than if such air escaped only through the filters and through the outlets 50; moreover, the cocks 80 enable the progress of the operation to be watched, both during filling and during the subsequent run, as samples of the mixture of filtering substance and liquid may be taken at any time at different levels of the apparatus by opening the proper cock 80. It will be understood that after all the cocks 80 have been closed, the apparatus will be fluid-tight, except for the inlet 38 and the exit provided through the filters and the outlets 50. The liquid will be admitted under sufficient pressure to cause it to travel from said inlet to said outlets, or suction may be applied at the outlet to draw the liquid, for instance by making the trough 51 air-tight and connecting the outlet pipe 56 with a pump (as in Fig. 14) or with a tank in which a partial vacuum is maintained in any well-known or approved manner. The scrapers may be set in motion when all the cocks 80 have been closed. The stirrers 30 and 30' will thoroughly mix the decolorizing carbon or filtering or purifying material or mixtures of such materials with the liquid under treatment, so that a homogeneous mass of paste-like or thinner consistency will be formed. The baffles 40 prevent the paste from taking a direct path from the inlet 38 to the lower end of the uptake 41, and compel the liquid and the filtering material to become thoroughly exposed to the action of the stirrers 30 and 30', so that a homogeneous mixture is obtained. While in the drum 25 the mixture is agitated and comes to a comparative rest in the lower portion of the uptake 41, in which it flows upward in a wide stream without appreciable agitation. The filtering or purifying material is then able to act very efficiently on the liquid by a so-called mass action. As the ascending liquid reaches the upper portion of the uptake 41, it passes through the bags 47 and wire netting 46, while the solids (that may be the filtering material, and the impurities retained thereby) are deposited on the outer surfaces of the cloth bags 47. The liquid then enters the pipe 45 through the perforations 45' and leaves the apparatus through the outlets, 50, trough 51, and pipe 56. The scrapers 57, as they reciprocate vertically, pare or shave off a portion of the material deposited on the surfaces of cloth bags 47, and thus prevent an accumulation of such thickness as would interfere with the proper passage of the liquid. The scrapers do not, or need not necessarily, however, come in contact with the bags 47 themselves. The solid material thus scraped off falls down the uptake 41 and finally into the drum 25 and is there agitated once more in contact with the liquid. With my procedure, since the filtering material is returned over and over again into contact with the liquid, by thoroughly mixing, I obtain a condition in which the filtering material at any particular moment is practically of uniform purity or filtering or purification power at every point of the apparatus, and the exhaustion of the filtering material proceeds gradually throughout the entire apparatus. The apparatus can be operated continuously for a relatively long time before the filtering material becomes exhausted to the degree at which it is necessary or desirable to remove it from the apparatus for regeneration, further treatment, or other disposal. When this stage is reached, the admission of liquid through the inlet is stopped, the outlet valve 34 is opened, while the rotation of shaft 29 is continued so that the paste remaining in the drum 25 will be carried from both ends thereof toward the outlet 25', through which it is discharged either as waste product or generally for regeneration for further treatment, a particularly satisfactory treatment being more fully explained hereinafter.

The inclined or beveled surfaces of the scrapers 57 are particularly effective in dislodging the solid deposit on the filter bags 47 and in causing such deposit to drop so that but little material will stick to the scrapers both during the upstroke and during the downstroke. Every time the scrapers reach their uppermost position, they come very close to the permanently rotating arms 75 or even into actual contact therewith, whereby any accumulation of material is removed from the upper surfaces of the scrapers. It will be understood that with the mechanism described the scrapers are stationary for a short time in their uppermost position (and in their lowermost position as well), while the rollers 73 are passing from the sockets 60'' on one side of the cross heads 60 to those on the other side. During this short stop or interval at the top the arms 75 sweep along and over the upper edges of the scrapers 57 and clean them.

Whenever the deposit on the filter bags 47 becomes clogged by impurities taken up by the filtering material to such an extent as to reduce the outflow of liquid and therefore increase the pressure within the apparatus, such pressure will cause the piston 90' to move as described herein opening the cocks 85 to admit compressed air to the interior of the filters proper and by automatically throwing out the clutch 69 the reciprocation of the scrapers 57 will be arrested while the mixing arms or stirrers 30 and 31' continue to operate. The cleaning arms 75 stop at the same time as the scrapers 57. The bulging of the filter bags 47 produced by this admission of compressed air will cause the deposit to drop off from the said bags, at least in part, and the bags thus offering again less resistance to the passage of the liquid, the pressure within the apparatus will fall and the spring 91 will restore the piston 90' to its normal position in which the clutch members 89' and 94 are out of engagement. The springs 71 and 100 will then cause the cocks 85 to close so as to stop the admission of compressed air and the clutch 69 will be thrown in so as to again reciprocate the scrapers 57 and rotate the cleaning arms 75. It is advisable when admitting compressed air to the filter elements to shut off the liquor inlet into the drum.

In Figs. 1 and 2, I have shown a type of apparatus which may be used for the further treatment of the spent filtering materials (with adhering liquid) removed through the outlet 25'. This material enters the casing or drum 103 in which is arranged a rotary shaft 104 provided with helical conveyor members 105 and 105' of opposite pitch located on opposite sides of the connection 25' arranged to feed the material to outlets 103' leading to vessels 106 each containing a shaft 107 rotated by suitable mechanism 108 and provided with agitators 109. The vessels 106 may be provided with projections or baffles 110 adjacent to the paths of the said agitators 109. Water or any other suitable liquid may be injected into the vessel 106 preferably at the lower part thereof, through pipes 111 having suitable nozzles. The outlets 112 of the vessels 106 lead to the drum 113 containing a suitable conveyor, say a rotary shaft 114 carrying helical members 115 and 115' of opposite pitch for delivering the material, through spouts 116 to separators of any suitable construction in which the liquid is separated from the solids. In the particular construction illustrated these separators consist of centrifugal appliances 117, with drive shafts 118 for their rotators and at 119 I have indicated a conveyor for the final separated product. In some cases, mere agitation and mixing in the vessels 106, followed by the separation and washing in appliances such as 117, will be sufficient to obtain the decolorizing carbon or other agent employed in a condition free of the liquid adhering to it so that it may be removed from the process and if desired regenerated according to any well known or approved method. In other cases, it may be desirable to inject water or other appropriate liquids into the vessels 106 in order to remove from the decolorizing carbon or other material sugar liquid or juices or other matter adhering thereto, and to obtain a mixture from which the decolorizing carbon may be separated more readily from the said liquids, juices or other matter. I may also utilize the apparatus shown in various other ways as by adding suitable extracting liquids or solvents in the centrifugals 117 instead of in the vessels 106, or at both points; also by bringing the solids separated by the centrifugals 117 back into the vessels 106 for a second treatment with suitable extracting or dissolving liquids. The liquid obtained by washing the mixture in the vessels 106, or other liquid may be utilized for the first washing in certain cases as in the manufacture of sugar, and sugar washed from the spent decolorizing carbon or other filtering material by means of water may be recovered by evaporation. Solvents used to act on said decolorizing carbon or other filtering or purifying substance may be recovered by evaporation, fractional distillation or other suitable methods.

It will be evident that two or more apparatuses of the character illustrated by Figs. 1 to 13 may be connected to form a battery. Thus, in Fig. 14 I have shown two such apparatuses A and B respectively arranged in series by connecting the liquid outlet 56 of the first apparatus A, with a pump which pumps the liquid into the inlet 38 of the second apparatus B. The advantage resides in the superior results which may be obtained by two or more successive treatments of the said liquid and also in the fact that different purifying or filtering agents may be employed for the successive steps. Thus kieselguhr, fuller's earth, etc., might be employed in one of the connected apparatuses and high grade decolorizing vegetable carbon, or any other decolorizing carbon in the other. Of course, the same agent might be used both in A and in B, or partly spent decolorizing carbon (resulting from the treatment of a previous amount of liquid) may be used in apparatus A and fresh or regenerated decolorizing carbon in apparatus B. Various possibilities and combinations will be readily perceived by a man skilled in this art.

While I have so far spoken chiefly of the treatment of impure liquids (say sugar liquor or juices) with an agent, preferably in fine powder form for the purpose of removing the impurities or undesirable ingredients entirely or in part, I have also indicated that my invention is applicable, broadly speaking, wherever it is desired to separate liquids from solids. That is to say in certain cases, no filtration-assisting material would be added, but I would pass through the apparatus nothing but the liquid (containing solids in suspension) from which it is desired to remove the solids. For instance, I might pass through the apparatus citric acid suspended in its mother liquor or in a liquid in which it is insoluble, but which would hold certain impurities in solution which it is desired to remove from the citric acid. This would remain in the apparatus to be discharged through the outlet 25', while the mother liquor together with the impurities dissolved therein and any washing liquid that may be employed would pass out through the pipe 56.

The separation of paraffine from paraffine oil might be effected in my apparatus. In such cases the mixing tank acts as a collector for the suspended solids.

Many other uses of my apparatus are possible and no exhaustive list of its applications can be given. I desire, however, to mention specially the fact that when I speak of liquids, I wish to include substances which at ordinary temperatures are solid and require some treatment such as heating to bring them into a liquid or semi-liquid condition in which they may be passed successfully through an apparatus of the character described. Substances or mixtures of a wax like nature would fall in this category, and as a particular instance I may mention the treatment of impure paraffine containing other petroleum products or mixed with fine substances of various kinds. For the treatment of such bodies, it may be desirable to somewhat modify the type of apparatus, say as indicated in Fig. 15 where the uptake part 41 may be assumed to be of the same construction as first described, but no long drum such as 25 is here required, and no mixer is absolutely necessary in this case, although I may employ such a mixer, located in a drum 25″ the length of which may be about equal to the width of the uptake 41. The inlet 38′ is preferably at the lower portion of said uptake and a heating jacket 26′ surrounds said drum partly or entirely, to melt or liquefy the substance under treatment at the end of the separating operation. The paraffine deposited on the surface of the filter elements and loosened by the scrapers 57 will fall back into the lower part as before until a quantity of paraffine is accumulated. Then the separation process is stopped, the liquid (paraffine oil) left in the filter is drained off and the paraffine melted or liquefied. The paraffine oil left in the melted paraffine can be driven out by steam after which the paraffine in liquefied form may be removed from the filter through the outlet 25′.

In Figs. 16 and 17 I have illustrated another form of the mechanism for imparting a reciprocating motion to the rods 59 connected with the scraper frame 58. The four rods 59 are connected above the cover 41′ by an X-shaped cross head 60ª having a centrally located internally threaded socket 60ᵇ through which extends the vertical shaft 121 suitably journaled in the cover 41′ and in the stationary bracket 61 61. Said shaft is held against longitudinal motion, and is provided with a screw thread engaging the socket 60ᵇ, so that the cross head 60ª and the rods 59 with the scrapers will be moved up or down according to the direction in which the shaft 121 is rotating at the time. The cross head 60ª carries a finger or actuator 60ᶜ adapted to operate a reversing mechanism of the following character: In the path of said actuator 60ᶜ is located an upper finger 122 and a lower finger 123, swinging about stationary horizontal axes 122′ and 123′ respectively, and held in either of their operative positions by springs 124 and 124′ respectively, these springs being so arranged as to assist in swinging the respective fingers as soon as they have passed the dead center position, and also to hold the fingers in their normal or operative positions. The two fingers are connected by a rod 125, and with one of the fingers is connected a crank 126 which by means of a connecting rod 127 operates a toothed sector 128 journaled at 129. The sector 128 is in mesh with a bevel gear 130 on a vertical shaft 131, provided with a crank arm 132, which by means of a link 133 operates a longitudinally sliding shifting rod 134 for changing the relation of the driving belts 135 and 136 to the pulleys 137, 138 and 139, all mounted on the horizontal shaft 140 which is parallel to the rod 134. The two belts 135, and 136 are permanently driven in opposite directions by any suitable means (not shown). In the particular instance illustrated, the pulley 137 rotates with the shaft 140, while the pulleys 138 and 139 are idlers. The arrangement is such that in shifting the belts, the belt which is driving at the time will be shifted to its idler (138 for the belt 135, and 139 for the belt 136) before the other belt comes in contact with the fast pulley 137. The shaft 140 also carries another fast pulley 140′ connected by a belt 141 with a pulley 142′ on a shaft 142, said pulley 142′ rotating in unison with a beveled pinion 142″ which meshes with a beveled gear 121′ on the screw shaft 121.

In Fig. 17 the belt 135 is shown in driving position and the shaft 121 is just beginning to rotate in the proper direction for moving the cross head 60ª downward. As the end of the downstroke is approached, the actuator 60ᶜ will engage the upwardly projecting free end of the lower finger 123 and gradually swing it down to the position indicated by dotted lines in Fig. 16. This causes the sector 128 to be rocked turning the shaft 131 to slide the belt shifting rod 134 lengthwise in such a direction as to bring the belt 135 on to the loose pulley 138 and subsequently the belt 136 on to the driving pulley 137. The shaft 140 is thus caused first to stop or at least to slacken in its rotation, and then to rotate in the opposite direction, thereby reversing the direction in which the shafts 142 and 121 rotate, and causing the cross head 60ª and the scraper frame 58 to begin their upstroke. Toward the end of this upstroke the actuator 60ᶜ engages the downwardly projecting free end of the upper finger 122 and gradually swings the parts to the position shown in full lines in Fig. 16, whereby the driving belts 135 and 136 are brought back to the position indicated in Fig. 17 and by this new reversal the cross head 60ª is started on its next downstroke.

In Fig. 1 I have indicated baffle plates 41″ in the lower portion of the uptake 41 that is to say below the filters. The purpose of these baffles is to further retard the flow of liquid at this point, so as to secure better precipitation of the material which is mechanically carried by the ascending liquid. It will be understood that these baffles 41″ may be omitted.

The filters have been shown in the upper part of the uptake 41, but they might extend the full height of the uptake or only in the lower part. These modifications and various others might be made without departing from the nature of my invention as defined in the appended claims.

While I have described the flow of the mixture of liquid and solid materials through the mixing and filtering apparatus as produced by admitting the liquid under pressure at the inlet 38, it will be obvious that the same result might be obtained by applying suction at the outlets 50 and in each case the flow of the mixture through the apparatus would be caused by the difference of pressure.

I claim as my invention—

1. An apparatus for the purpose set forth, comprising a mixer, a filter in direct communication with said mixer and forming a unitary structure therewith, baffle means located in the path of the liquid between the mixer and the filter to retard the flow, and means for removing deposits from the filter, such deposits being then returned to the mixer.

2. An apparatus for the purpose set forth, comprising a mixer, a filter in direct communication with said mixer and forming a unitary structure therewith, and baffle means interposed between the mixer and the filter to regard the flow of the material.

3. In apparatus for the purification of liquids and the separation of the used purifying material containing the removed impurities from the treated liquid, means for the continuous mixing of the liquid with the said material, a separator operating on the resulting mixture supplied thereto under pressure said pressure normally being powerful enough to hold said material firmly against the surface of the separator and means for the removal of said material from the surface of the separator by discontinuing or suspending temporarily such holding effect of said pressure during the continuous separating operation while keeping practically the entire amount of said purifying material used in continuous contact with practically all the liquid under treatment in the apparatus during the entire process of purification and separation.

4. In filtering apparatus, a casing containing a mixer for mixing the liquid to be filtered with the filtering substance, and a filter located above said mixer and adapted to receive the liquid-and-filtering substance mixture from said mixer and to separate the purified liquid from the filtering substance, any detached portions of said substance dropping back into the mixer.

5. In filtering apparatus, an approximately horizontal mixer for mixing the liquid to be filtered with the filtering substance, a column communicating with said mixer and rising at the discharge end thereof, and a filter located in the upper portion of said column.

6. In filtering apparatus, an approximately horizontal mixer for mixing the liquid to be filtered with the filtering substance, a column communicating with said mixer and rising at the discharge end thereof, a filter located in the upper portion of said column, and a movable scraper for detaching the filtering material from said filter.

7. In filtering apparatus, an approximately horizontal mixer for mixing the liquid to be filtered with the filtering substance, a column communicating with said mixer and rising from the discharge end thereof, baffle means for compelling the material to pass through the entire length of the mixer before entering said column, and a filter located in the upper portion of said column.

8. In filtering apparatus, a casing, a filter therein, a scraper movable adjacent to the filtering surface, and a guide for said scraper, interposed between the scraper and the filtering surface to prevent contact of the scraper with said surface.

9. In filtering apparatus, a filter, a scraper movable adjacent to the filtering surface, and a guide for said scraper, interposed between the scraper and said filtering surface to prevent contact of the scraper with said surface.

10. In filtering apparatus, a mixer for mixing the liquid to be filtered with the filtering substance, a filter for receiving the mixture of liquid and filtering substance from the mixer, a scraper for said filter, and operatively connected means for actuating said mixer and said scraper.

11. In a filtering apparatus, a filter, a scraper arranged to move adjacent to the surface of said filter, a casing containing said filter and scraper, operating mechanism extending through the casing to said scraper, and means for heating said mechanism at the point where it passes through the casing.

12. In a filtering apparatus, a casing, a filter therein, a member responsive to changes of pressure within said casing, and means, controlled by said member, to admit a medium under pressure to the filter in the direction opposite to the normal flow, when the pressure within the casing exceeds a predetermined point.

13. In filtering apparatus, a casing, a filter therein, a member responsive to changes of pressure within said casing, a scraper for said filter, means for operating said scraper, and means, controlled by said member, to admit a medium under pressure to the filter in the direction opposite to the normal flow, and to arrest the movement of the scraper.

14. In filtering apparatus, a casing, a filter therein, a scraper arranged to reciprocate lengthwise of the filter, and a cleaning device arranged to move adjacent to said scraper when the latter is at the end of one of its strokes.

15. In filtering apparatus, a casing, a filter therein, a scraper arranged to reciprocate lengthwise of said filter, and a cleaning arm arranged to rotate about an axis parallel to the path of the scraper, to clean the scraper at the end of one of its strokes.

16. In filtering apparatus, a casing, a filter comprising a core, a filtering bag thereon, and a guiding band projecting from said bag, and a scraper arranged to reciprocate along said guiding band, and out of contact with the bag.

17. In filtering apparatus, a casing and a filter therein, said filter comprising a transversely-arranged perforated tube serving as an outlet, a core located adjacent to said tube and having tubular portions arranged in columns and forming registering passages, and a filtering cover on said core.

18. In filtering apparatus, a casing and a filter therein, said filter comprising a transversely-arranged outlet tube, a core located adjacent to said tube and of hexagonal cellular structure, with registering tubular portions, extending lengthwise of the core, at the junction points of adjoining cells, and a filtering cover on said core.

19. In filtering apparatus, a casing, a filter therein, an outlet pipe for the filter, and a tube for the admission of a fluid under pressure, leading into the filter through said outlet pipe.

20. In filtering apparatus, a casing, a filter therein, a scraper arranged to reciprocate along the filter, a drive chain having its runs parallel to the path of the scraper, a cross head connected with the scraper and arranged to move adjacent to said chain, means projecting from the chain and engaging the cross head at different points during successive strokes of the scraper, and means, independent of said projecting means, for supporting said cross head while said projecting means is passing from one run of the chain to the other.

21. In filtering apparatus, a drum provided with a liquid inlet at one end and with an outlet at its central portion, a column rising from the other end of said drum, a movable mixing device arranged in the drum and constructed to feed solid material from both ends of the drum toward said outlet, a filter in said column, and scraping mechanism co-operating with the filter and arranged to cause the material loosened from the filter to drop back toward and into the mixing drum.

22. In filtering apparatus, a drum provided with an inlet for the liquid, a column the lower end of which connects with said drum and the upper end of which has an outlet, a filter in said column, means in said column for scraping solid material off the filter and causing such material to drop back into the drum, and movable means located in the drum and arranged to feed such solid material in the direction opposite to the flow of the liquid.

23. In filtering apparatus, a mixer provided with an inlet at one end and with an outlet at the other end, a filter casing located directly above said outlet and communicating with the mixer therethrough, a filter in said casing, and means for detaching the solids deposited on said filter and causing them to drop back into the mixer.

24. In filtering apparatus, a mixer having a liquid inlet at one end, a liquid outlet at the other end, and an intermediate outlet for solid material, a mechanical device located in said mixer and comprising portions located on opposite sides of said intermediate outlet and tending to feed solid material in opposite directions, whereby the solid material may be fed toward said intermediate outlet from each side and a separator connected with said liquid outlet.

25. In filtering apparatus, a casing having an outlet for solid material, a filter in said casing, a vessel connected with said outlet and provided with means for supplying a liquid to treat said material and also with agitating means and having an outlet for the mixture of such liquid and material, and a device, connected with the outlet of said vessel, for separating the liquid from the solid material treated thereby.

26. In filtering apparatus, a casing having an outlet for solid materials, a filter in said casing, a plurality of vessels, having means for supplying liquid thereto and provided with outlets, conveying means for transferring the solid materials from said outlet of the casing to the several vessels, and a device, connected with the outlets of all of said vessels, for separating liquid from solid material.

27. In filtering apparatus, a casing having an outlet for solid materials, a filter in said casing, a plurality of vessels having outlets, means for transferring the solid materials from said outlet of the casing to the several vessels, an agitator and a liquid-supplying device in each vessel, and means, connected with the outlets of all of said vessels, for separating liquid from solid material.

28. In filtering apparatus, a casing having an outlet for solid materials, a filter in said casing, a plurality of vessels having outlets, means for transferring the solid materials from said outlet of the casing to said vessels, separate liquid-supply connections to each vessel, an agitator in each vessel, and centrifugal separating means connected with the outlets of said vessels.

29. The herein described process of separating solid from liquid materials, which consists in causing a mixture of such materials to flow to and through a filter, and causing the rise of pressure which occurs on the inlet side of the filter upon a partial clogging of the latter, to bring about automatically the introduction into the filter, through the outlet side thereof, of a medium under pressure to act in the direction opposite to the flow of the liquid through the filter.

30. The herein described process of separating solid from liquid materials, which consists in passing a mixture of such materials to and through a filter while scraping the filter surface on the inlet side, and causing the rise of pressure which occurs on the inlet side of the filter upon a partial clogging thereof, to bring about automatically a stoppage of the scraping action and the introduction into the filter, through the outlet side thereof, of a medium under pressure to act in the direction opposite to the flow of the liquid through the filter.

31. The herein described process of filtering liquids, which consists in mixing the liquid to be filtered, with a large mass of filtering material, causing the mixture to flow first horizontally and then upwardly to a filter, exerting a mechanical action on the solids while they are traveling horizontally, to urge them in a direction contrary to the flow of the mixture, passing the liquid through said filter while depositing the solids on the inlet side thereof, and scraping the deposit from the filter to cause such deposit to fall within the ascending stream.

In testimony whereof I have signed this specification.

JOHAN NICOLAAS ADOLF SAUER.